C. F. ZILLMER & G. A. STROHHAECKER.
TRACTION DEVICE FOR AUTOMOBILES.
APPLICATION FILED MAR. 29, 1909.
967,100.
Patented Aug. 9, 1910.
3 SHEETS—SHEET 1.
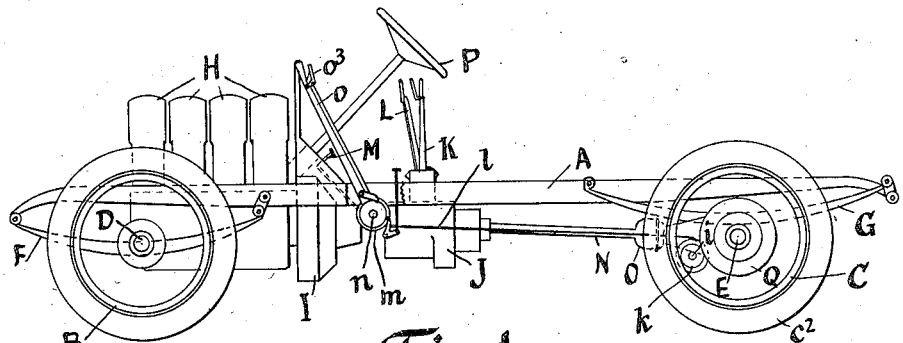
Fig. 1
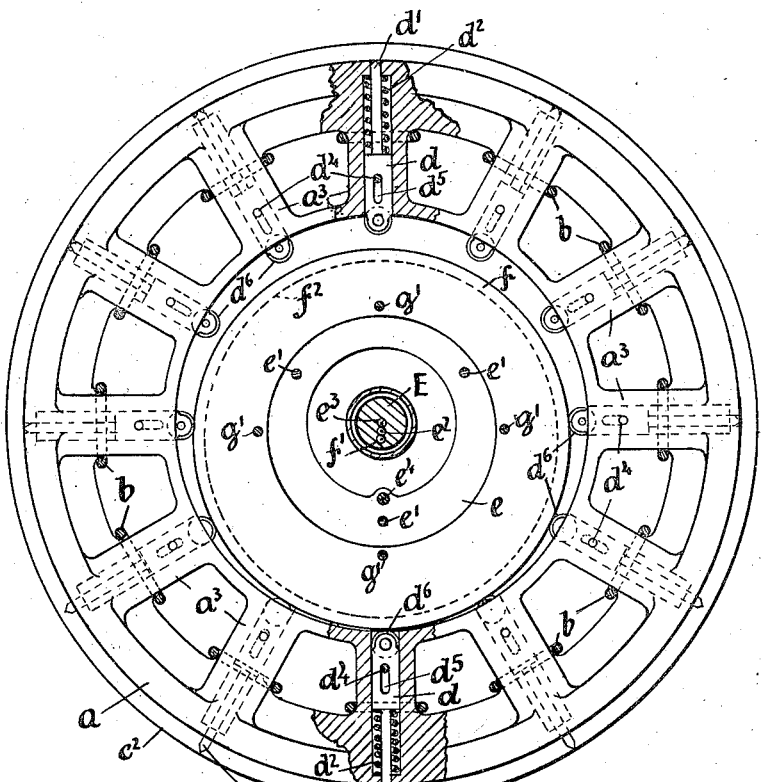
Fig. 2
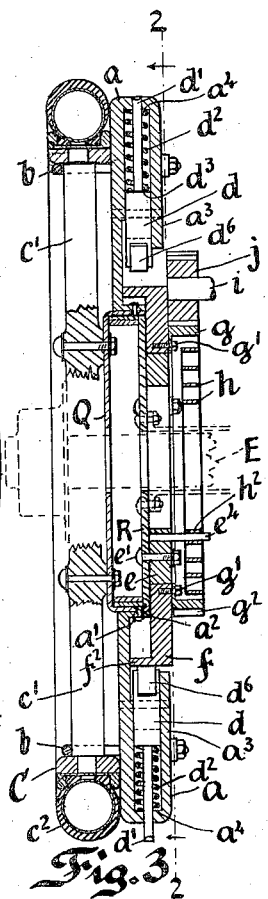
Fig. 3

C. F. ZILLMER & G. A. STROHHAECKER.
TRACTION DEVICE FOR AUTOMOBILES.
APPLICATION FILED MAR. 29, 1909.

967,100.

Patented Aug. 9, 1910.

3 SHEETS—SHEET 2.

Charles F. Zillmer and
George Anton Strohhaecker, Inventors

Witnesses
Wilhelmina D. Schienbein
Joseph M. Gruber

By George Vetmore Colles
Attorney

C. F. ZILLMER & G. A. STROHHAECKER.
TRACTION DEVICE FOR AUTOMOBILES.
APPLICATION FILED MAR. 29, 1909.
967,100.
Patented Aug. 9, 1910.
3 SHEETS—SHEET 3.
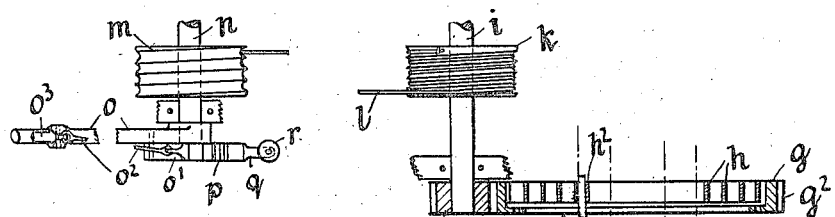
Fig. 7. Fig. 9.
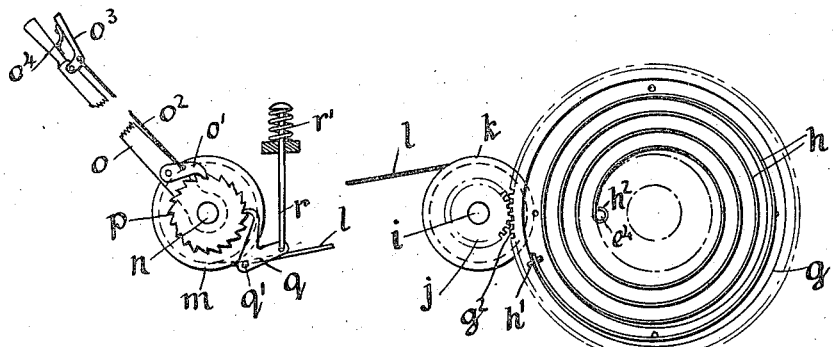
Fig. 8. Fig. 10.

UNITED STATES PATENT OFFICE.

CHARLES F. ZILLMER AND GEORGE ANTON STROHHAECKER, OF MILWAUKEE, WISCONSIN.

TRACTION DEVICE FOR AUTOMOBILES.

967,100.      Specification of Letters Patent.      Patented Aug. 9, 1910.

Application filed March 29, 1909. Serial No. 486,319.

*To all whom it may concern:*

Be it known that we, CHARLES F. ZILLMER and GEORGE ANTON STROHHAECKER, of Milwaukee, Wisconsin, have invented a Traction Device for Automobiles, of which the following is a specification.

Our invention relates to the traction-wheels of motor-vehicles, and more particularly to those of automobiles, where the structure and conditions are of a special nature; and the object designed to be accomplished is two-fold, namely: first, to provide means for preventing the wheels from slipping and skidding in either hard or soft, slippery, marshy, or snow-covered ground; and secondly to provide an emergency wheel adapted to replace the pneumatic tire and support the vehicle independently thereof in case of puncture or injury to the pneumatic tire.

We further aim to provide a device of this sort which can be mounted upon any automobile, which shall not involve the addition of an excessive weight or bulk, and which shall be substantially hidden behind the traction-wheel and therefore not appearing or being conspicuous to the eye, or otherwise marring the general appearance of the vehicle.

Briefly described, our invention comprises a secondary wheel or wheel-rim mounted upon and on the inner side of the ordinary wheel and carrying a plurality of radial pins which are normally held retracted within said wheel-rim by means of springs, but are projected at will beyond the wheel-rim by means of a certain mechanism which is under the control of the operator of the vehicle.

The nature and construction of our invention will be best understood by a particular description thereof which is hereinbelow given, reference being had to the accompanying drawings which illustrate our most approved form of the invention.

Figure 6:
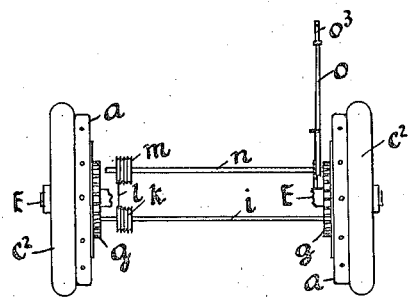
Figure 4:
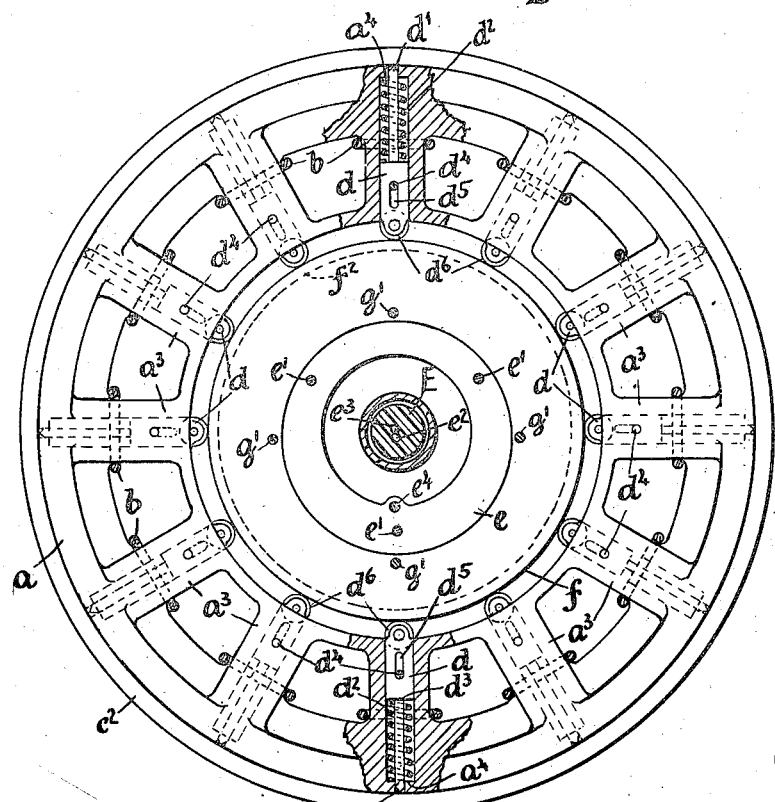
Figure 5:
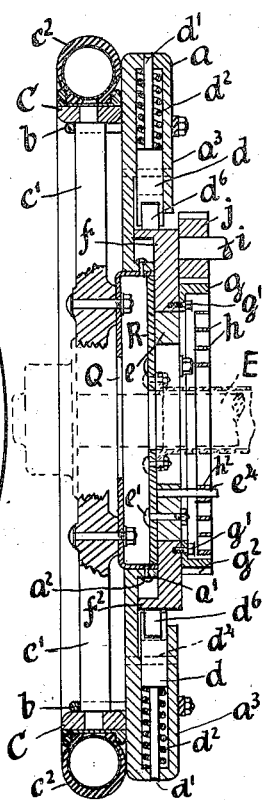

In these drawings, Figure 1 is a side elevation of an automobile frame and a part of the mechanism constructed with our traction-device, to show the general arrangement of actuating levers which may be adopted; Fig. 2 is an elevation of the traction-device and wheel from the inner side of the latter, with the anchor-pins projected, certain parts being shown in section on the plane 2 of Fig. 3, and two of the pin-casings being shown in section; Fig. 3 is a diametral section of the wheel and traction device, in the position with the anchor-pins projected, certain parts not connected with the invention being omitted; Figs. 4 and 5 are views similar to Figs. 2 and 3 respectively, with the anchor-pins retracted; Fig. 6 is a rear elevation of the pair of driving-wheels and traction-devices mounted thereon, showing a part of the operating-mechanism; Fig. 7 is a plan view and Fig. 8 a side elevation of the operating-lever and winding-drum on the operating shaft; and Fig. 9 is a plan section and Fig. 10 a side elevation to show the retracting-spring and spring-casing and the gearing connected therewith.

Describing the principal parts of the automobile which are shown in the drawings for the purpose of illustration but not connected directly with the invention, A is the vehicle-frame, B the front or steering-wheels, C the rear or driving-wheels, said wheels being mounted respectively on axles D and E, from which the frame A is supported through springs F, G; H is the driving-motor, I the fly-wheel and clutch, J the speed-changing gearing operated by levers K, L and M: N represents the transmission-shaft, with a universal joint at O and P represents the steering-wheel of the machine. The other elements shown in Fig. 1, which constitute the operating-gearing, will be described presently.

On each inner side of the traction-wheel is mounted a secondary wheel $a$, which is in fact only a rim without a hub, clamped in position upon the main wheel C in any suitable manner, as for instance by clamping-bolts $b$ securing it to the spokes $c'$, said wheel having a flange $a'$ fitting over the external periphery of the brake-casing Q which is customarily found on the inside of the driving-wheels of automobiles, and said flange $a'$ being in the drawing secured fast to the brake-casing by rivets $a^2$; but it will be understood that the mounting of the device is not dependent upon the presence or absence of a brake-casing, as any other means which will hold the secondary wheel $a$ firmly in place concentric with the axis of rotation is consistent with our invention. The secondary wheel $a$ is formed with a plurality of radial casings $a^3$ equably spaced about the periphery and preferably so located that they are directly behind the spokes $c'$, thereby being partly or wholly hidden by the latter. These casings are centrally bored to receive anchor-pins $d$ which have sharp edged ends $d'$ adapted to project beyond the periphery and cut into the material of the road, thereby holding the wheel against slipping. These pins are normally held retracted by coiled compression-springs $d^2$ within the casings $a^3$, each of said springs abutting at its outer end against an internal shoulder $a^4$ of the casing and at its inner end against a shoulder $d^3$ upon the pin. The inward movement of the pin is limited in any preferred manner, as for example by cross-pins $d^4$ fitting in slots $d^5$ in the pins $d$. These pins are arranged to be projected from the rim of the secondary wheel $a$ on the lower side of the wheel only, as they revolve, by a mechanism under the control of the operator, which is as follows: Upon any stationary part of the mounting, as for example the closure-plate R of the brake-casing, to which it may be attached by suitable means such as bolts $e'$ is an eccentric sheave $e$, the center of which is located at the point $e^2$, a short space directly below the center $e^3$ of the axle E. Upon this sheave is rotatably mounted another eccentric sheave $f$, the periphery of which has the same eccentricity with regard to the sheave $e$ as the latter has with respect to the axle; so that in Fig. 2, in which the sheave $f$ is turned into the projected position, its center lies at the point $f'$ immediately below the center $e^2$ of the inner sheave $e$, and at a distance from the center of rotation $e^3$ equal to twice the eccentricity of either sheave alone; while when said sheave $f$ is rotated into the diametrically opposite position from that of Fig. 2, as shown at Fig. 4, its center point coincides with the center of rotation $e^3$; in other words in this position the sheave $f$ is concentric with the axis of rotation of the wheel. Now the periphery of this outer sheave $f$, which may be formed with a marginal flange $f^2$ for the purpose, acts directly upon the inner ends of the pins $d$, which latter are preferably provided with antifriction rollers $d^6$; and it will be observed therefore, that in the concentric position, as shown in Fig. 4, the periphery of the sheave $f$ lies entirely within their retracted positions, consequently they are not affected; but when turned through an angle from this position they are more or less projected from the periphery upon the lower side of the wheel (but not upon the upper side), in amount depending upon the angle through which the sheave $f$ is rotated, the projection of the pins being a maximum when the sheave is rotated through an angle of 180 degrees from the position of Fig. 4, as shown in Fig. 2.

It remains to provide means under the control of the operator for effecting the rotation described and thus causing the anchor-pins to bite into the roadway; and while we do not limit ourselves to any specific means for effecting this rotation, as manifestly it will lie within the skill of the mechanic to devise such mechanical elements, that which we prefer and which is shown in the drawings is as follows: An annular spring-casing or box $g$ is secured by bolts $g'$ or other fastenings to the sheave $f$, said casing being provided with spur-teeth $g^2$ upon its outer periphery, which spur-teeth are described upon a pitch-line concentric with the point $e^2$, about which the sheave $f$ rotates. Within this casing $g$ is located a volute-spring $h$, one end of which is secured at $h'$ to the casing $g$, and the other at $h^2$ to a stationary point, as for example a projection $e^4$ on the sheave $e$. Mounted adjacent to the outer side of the casing $g$ is a transverse shaft $i$ carrying pinions $j$, one on each end, meshing with the teeth $g^2$ on the spring-casings of the respective wheels; and on the shaft $i$ is also mounted a winding-drum $k$ for a cord or other flexible connection $l$, whose other end passes around a winding-drum $m$ mounted on the operating-shaft $n$, which is located at a convenient point near the front of the vehicle as shown in Fig. 1. The shaft $n$ is actuated to wind the cord upon the drum $m$ and unwind it from the drum $k$ by means of the operating-lever $o$, which is loose upon the shaft and carries a pawl $o'$ meshing with the teeth of a ratchet-wheel $p$ keyed to said shaft; said pawl $o'$ being connected by a link $o^2$ with a finger-lever $o^3$ on the lever $o$ whereby it is withdrawn from the wheel at the will of the operator, but is normally held in engagement therewith by a spring $o^4$. The wheel $p$ is also engaged by a stationary pawl $q$ pivoted at $q'$ and actuated by a depressible plunger $r$, normally held raised by a spring $r'$ so as to hold the pawl $q$ in engagement with the teeth of the wheel $p$. When the operator desires to project the anchor-pins $d$ from the periphery of the secondary wheel, he draws the lever $o$ toward him and thus winds the cord $l$ upon the drum $m$, unwinding it from the drum $k$ and thereby turning the axle $i$, spring-casing $g$ and sheave $f$; this operation being repeated a number of times by oscillating the lever $o$, if it is desired to bring the anchor-pins to their full extension. This rotation of the spring-casing acts to wind up the spring $h$, which accordingly, when the ratchet-wheel $p$ is released by depressing the plunger $r$ and compressing the finger-lever $o^3$, returns the sheaves $f$ to their original position, at the same time rewinding the cord $l$ upon the drum $k$ and unwinding it from the drum $m$.

It will be observed that, as shown in the drawings, the pins $d$ when projected do not actually extend substantially beyond the tire $c^2$ of the wheel. They are so shown because in actual practice the weight of the vehicle upon the tire produces a flattening thereof, so that in effect the tire will be depressed below the projected ends of the pins, but still beyond the tread of the secondary wheel $a$. If however the tire becomes too much flattened, as from puncture or loss of air, then it will become deflated down to or below the rim of the wheel $a$ so that the latter will take a part or all of the weight, thus preventing rim-cutting and general destructive action of the road upon the tire. Our device is therefore adapted to act not simply as a traction-device, but also as an emergency-wheel, and will therefore make unnecessary the carrying of extra tires and wheels with the vehicle and the immediate stopping for repairs in case of a breakdown.

From the above description it will be readily seen that our invention will assume a variety of forms all embodying the same principles and that a great number of changes and modifications are possible in the nonessentials without departing from the spirit of our invention, the scope of which is particularly defined in our claims.

Having thus described our invention, what we claim as new and desire to secure by Letters Patent is:

1. A device of the class described comprising, in combination, a wheel, a plurality of pins radially set in the periphery of said wheel and adapted to be extended beyond said periphery, a fixed member on which said wheel is journaled, a circular eccentric sheave mounted on said fixed member and having its center at a point below the axis of rotation of said wheel, a nonconcentric member rotatably mounted on said sheave and one part of the periphery whereof is adapted to press upon the inner ends of said pins and cause them to be projected from the periphery of said wheel, gear-teeth mounted on said nonconcentric member, a shaft parallel to the axis of rotation of said wheel, a pinion mounted on said shaft and meshing with said gear-teeth, an operating-shaft, an operating-lever adapted to rotate said shaft, and a mechanical connection between the two shafts whereby the first is rotated from the second.

2. A device of the class described comprising, in combination, a wheel, a plurality of pins radially set in the periphery of said wheel and adapted to be extended beyond said periphery, a fixed member on which said wheel is journaled, a circular eccentric sheave mounted on said fixed member and having its center at a point below the axis of rotation of said wheel, a nonconcentric member rotatably mounted on said sheave and one part of the periphery whereof is adapted to press upon the inner ends of said pins and cause them to be projected from the periphery of said wheel, gear-teeth mounted on said nonconcentric member, a shaft parallel to the axis of rotation of said wheel, a pinion mounted on said shaft and meshing with said gear-teeth, a second transverse shaft, a winding-drum mounted on each of said shafts, a cord connecting the two winding-drums in such manner that it is wound on one shaft when unwound from the other, and an operating-lever adapted to rotate said second shaft to wind said cord on the winding-drum carried by it.

3. A device of the class described comprising, in combination, a wheel, a plurality of pins radially set in the periphery of said wheel and adapted to be extended beyond said periphery, a fixed member on which said wheel is journaled, a circular eccentric sheave mounted on said fixed member and having its center at a point below the axis of rotation of said wheel, a nonconcentric member rotatably mounted on said sheave and one part of the periphery whereof is adapted to press upon the inner ends of said pins and cause them to be projected from the periphery of said wheel, gear-teeth mounted on said nonconcentric member, a shaft parallel to the axis of rotation of said wheel, a pinion mounted on said shaft and meshing with said gear-teeth, a second transverse shaft, a winding-drum mounted on each of said shafts, a cord connecting the two winding-drums in such manner that it is wound on one shaft when unwound from the other, an operating-lever adapted to rotate said second shaft to wind said cord thereon, a volute spring connecting said nonconcentric member with a fixed point in such manner that it is wound up by the action of said operating-lever; and means for disengaging said operating-lever from the second shaft whereby said spring acts to return the parts to their original position.

4. The combination with a motor-vehicle of a secondary wheel mounted at the side of one of the traction-wheels, a plurality of anchor-pins radially mounted in recesses in said secondary wheel, the outer ends of said pins being adapted to be projected beyond the periphery of said wheel and the inner ends being normally projected internally within said wheel, means for holding said pins normally in retracted position, an eccentric circular sheave mounted in fixed position with its center lying below the axis of rotation of the wheel, a second eccentric sheave rotatably mounted upon the first and having an eccentricity with respect thereto equal to the eccentricity of the first with respect to the wheel, the periphery of said second sheave being adapted when said sheave is turned out of the concentric position to act upon the inner ends of the pins lying on the lower side of the wheel and cause them to be projected, an annular spring-casing mounted on said second sheave, a volute spring mounted within said casing and fixed at one end and having the other end attached to the casing, and means for rotating said casing.

5. The combination with a motor-vehicle of a secondary wheel mounted at the side of one of the traction-wheels, a plurality of anchor-pins radially mounted in recesses in said secondary wheel, the outer ends of said pins being adapted to be projected beyond the periphery of said wheel and the inner ends being normally projected internally within said wheel, means for holding said pins normally in retracted position, an eccentric circular sheave mounted in fixed position with its center lying below the axis of rotation of the wheel, a second eccentric sheave rotatably mounted upon the first and having an eccentricity with respect thereto equal to the eccentricity of the first with respect to the wheel, the periphery of said second sheave being adapted when said sheave is turned out of the concentric position to act upon the inner ends of the pins lying on the lower side of the wheel and cause them to be projected, an annular spring-casing mounted on said second sheave, a volute spring mounted within said casing and fixed at one end and having the other end attached to the casing, said casing having gear-teeth upon its periphery, a shaft carrying a pinion meshing with said gear-teeth, and hand-controlled means for rotating said shaft.

6. The combination with a motor-vehicle of a secondary wheel mounted at the side of one of the traction-wheels, a plurality of anchor-pins radially mounted in recesses in said secondary wheel, the outer ends of said pins being adapted to be projected beyond the periphery of said wheel and the inner ends being normally projected internally within said wheel, means for holding said pins normally in retracted position, an eccentric circular sheave mounted in fixed position with its center lying below the axis of rotation of the wheel, a second eccentric sheave rotatably mounted upon the first and having an eccentricity with respect thereto equal to the eccentricity of the first with respect to the wheel, the periphery of said second sheave being adapted when said sheave is turned out of the concentric position to act upon the inner ends of the pins lying on the lower side of the wheel and cause them to be projected, an annular spring-casing mounted on said second sheave, a volute spring mounted within said casing and fixed at one end and having the other end attached to the casing, said casing having gear-teeth upon its periphery, a shaft carrying a pinion meshing with said gear-teeth, a second shaft parallel to the first at the front end of the vehicle, a pair of winding-drums one on each shaft, a cord connecting said winding-drums in such manner that said cord is unwound from one as it is wound upon the other, a ratchet-gear mounted on said second shaft, an operating-lever turning about said shaft as an axis, a fixed pawl engaging said ratchet-wheel and having means for disengaging it from said wheel, and a pawl carried on said lever normally engaging said ratchet-wheel and having means for disengaging it from said wheel.

7. In a motor vehicle, in combination with a traction-wheel having a plurality of spokes, a secondary wheel secured thereto at the side thereof and coaxially therewith, said secondary wheel having an equal number of casings which lie in the same radial planes as the spokes of the traction-wheel and which are formed with radial sockets therein, a plurality of anchor-pins mounted in said sockets and radially reciprocable, said pins being adapted to be projected from the periphery of said secondary wheel, and means for projecting said pins.

8. In a motor vehicle, in combination with a traction-wheel having a plurality of spokes, a secondary wheel secured thereto at the side thereof and coaxially therewith, said secondary wheel having an equal number of spokes, which lie in the same radial planes as the spokes of the traction-wheel and are formed with radial sockets therein, a plurality of anchor-pins mounted in said sockets and radially reciprocable, said pins being adapted to be projected from the periphery of said secondary wheel, means for projecting said pins, and a plurality of compression-springs mounted in said sockets and abutting at their outer ends on shoulders on said sockets and at their inner ends upon shoulders on said pins whereby to hold said pins resiliently retracted.

9. A traction-device for vehicles comprising a frame adapted to be secured to the side of a wheel thereof, a plurality of radial anchor-pins carried by said frame and radially movable therein, and a device adapted to be mounted on a fixed support for the wheel in a predetermined position; the inner ends of said pins projecting from said frame, and said device having an element which lies in the path of said pins as they reach the lower side of the wheel and causes them to project successively outward a sufficient distance to bite into the surface of the roadway.

10. A traction-device for vehicles comprising, in combination, a frame adapted to be secured to the side of a wheel thereof, a plurality of radial anchor-pins mounted on said frame and radially movable, said pins being adapted to be projected sufficiently to bite into the roadway, and shiftable means mounted on a fixed part of the vehicle for producing a projection of said pins.

11. A traction-device for vehicles comprising, in combination, a frame carrying a plurality of radially shiftable anchor-pins; means for securing said frame to a wheel, a shiftable cam-device mounted on a fixed part of the vehicle, and means operatively connecting said pins with the said cam-device, the shape of said cam-device being such as to cause the pins to be projected in one position thereof, and not so in another position.

12. A traction-device for vehicles comprising, in combination, a frame carrying a plurality of radially shiftable anchor-pins, means for securing said frame to the vehicle-wheel, and a member shiftably and eccentrically mounted with respect to said wheel upon a fixed part of the vehicle; said pins having portions which are adapted to come in contact with said member in one position of the latter and thereby caused to be moved radially outward sufficiently to bite into the roadway.

13. A traction-device for vehicles comprising, in combination, a frame having means for securing it to a vehicle-wheel and a plurality of tubular spokes, a plurality of radially shiftable anchor-pins carried in the bores of said spokes, and means for causing a radial outward movement of said pins as they approach the lower side of said wheel and their radial inward movement as they recede therefrom.

14. A traction-device for vehicles comprising, in combination, a frame having the same number of tubular radial spokes as the vehicle-wheel, means for securing said frame side by side to the vehicle-wheel in a position in which each spoke of said frame lies adjacent to a corresponding spoke of the wheel, a plurality of radially movable pins within the bores of the respective spokes, and means for causing the outward radial movement of said pins as they approach the lower side of said wheel and their inward radial movement as they recede therefrom.

15. A traction-device for vehicles comprising, in combination, a frame having a plurality of tubular spokes, a plurality of radially shiftable anchor-pins carried in the bores of said spokes, and means for causing the radial outward movement of said pins as they approach the lower side of said wheel and their radial inward movement as they recede therefrom; said means being shiftable into a position in which it does not act upon said pins.

16. In combination with a vehicle-wheel having a comparatively resilient tread, an auxiliary wheel mounted coaxially therewith and adjacent thereto and having a comparatively nonresilient tread of slightly smaller diameter than said resilient tread and a plurality of radial retractable anchor-pins set in said nonresilient tread.

17. In combination with a vehicle-wheel having a comparatively resilient tread, an auxiliary wheel mounted coaxially therewith and adjacent thereto and having a comparatively nonresilient tread of slightly smaller diameter than said resilient tread, a plurality of radially movable anchor-pins mounted on said auxiliary wheel, and means for moving said pins radially outward whereby they are projected beyond said nonresilient tread.

18. In combination with a vehicle-wheel having an inflatable tire, an auxiliary wheel secured to the side thereof coaxially therewith and having a tread lying within the outer periphery of said tire when it is inflated but beyond the same when the tire is deflated, and a plurality of retractable anchor-pins set in the periphery of said auxiliary wheel.

19. In combination with a vehicle-wheel having an inflatable tire, an auxiliary wheel secured to the side thereof coaxially therewith and having a tread lying within the outer periphery of said tire when it is inflated but beyond the same when the tire is deflated, a plurality of radially movable anchor-pins mounted on said auxiliary wheel, and means for projecting said anchor-pins beyond the tread thereof.

20. In combination with a vehicle-wheel having an inflatable tire, an auxiliary wheel secured to the side thereof coaxially therewith and having a tread lying within the outer periphery of said tire when it is inflated but beyond the same when the tire is deflated, a plurality of radially movable anchor-pins mounted on said auxiliary wheel and a stationary device acting on said anchor-pins to move them radially outward as they approach the lower side of the wheel and radially inward as they recede therefrom.

21. In combination with a vehicle-wheel, having an inflatable tire, an auxiliary wheel secured to the side thereof coaxially therewith and having a tread lying within the outer periphery of said tire when it is inflated but beyond the same when the tire is deflated, a plurality of radially movable anchor-pins mounted on said auxiliary wheel, and a stationary device acting on said anchor-pins to move them radially outward as they approach the lower side of the wheel and radially inward as they recede therefrom; said device being shiftable into a position in which it does not act on said pins as they rotate.

22. A traction-device for vehicles comprising, in combination, a frame adapted to be secured to a vehicle-wheel, said frame carrying a plurality of radially movable pins, said pins being projectable sufficiently to bite into the roadway and having portions adapted to be acted on by the hereinafter named eccentric sheave, springs acting on said pins to hold them normally retracted, an eccentric sheave mounted on a fixed portion of the vehicle adjacent to the wheel, its center lying below the center of rotation of said vehicle, and a second sheave mounted on said first sheave and having the same eccentricity with respect thereto as the latter has with respect to the axis of the wheel; said second sheave being adapted to be rotated so as to be either concentric with or eccentric to the axis of the wheel and its periphery in the latter position lying in the path of said portions of the pins whereby it is caused in such position to act on same as hereinabove said; and means for rotating said last-named eccentric sheave.

In witness whereof we have hereunto set our hands this 27 day of March 1909.

CHARLES F. ZILLMER.
GEORGE ANTON STROHHAECKER.

Witnesses:
PETER KIRCHEN,
WM. F. THIEL.